United States Patent
Hanaki et al.

(10) Patent No.: US 7,532,578 B2
(45) Date of Patent: May 12, 2009

(54) COMMUNICATION SYSTEM, COMMUNICATION METHOD AND MOBILE STATION

(75) Inventors: Akihito Hanaki, Yokohama (JP); Minami Ishii, Yokohama (JP); Sung Uk Moon, Yokosuka (JP); Takehiro Nakamura, Yokosuka (JP); Masafumi Usuda, Yokosuka (JP); Mayu Yamada, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 918 days.

(21) Appl. No.: 10/728,981

(22) Filed: Dec. 8, 2003

(65) Prior Publication Data

US 2004/0160955 A1    Aug. 19, 2004

(30) Foreign Application Priority Data

Dec. 6, 2002    (JP)    .............................. 2002-355799

(51) Int. Cl.
*H04L 12/26*    (2006.01)
*H04L 12/56*    (2006.01)

(52) U.S. Cl. ....................................... 370/252; 370/390
(58) Field of Classification Search .................. 370/390
See application file for complete search history.

(56) References Cited

U.S. PATENT DOCUMENTS

| | | | | |
|---|---|---|---|---|
| 5,940,391 | A * | 8/1999 | Malkin et al. ................ | 370/390 |
| 6,359,902 | B1 * | 3/2002 | Putzolu ....................... | 370/466 |
| 6,549,541 | B1 * | 4/2003 | Sainio et al. ................ | 370/412 |
| 6,680,909 | B1 * | 1/2004 | Bansal et al. ................ | 370/231 |
| 6,856,604 | B2 * | 2/2005 | Lundby ....................... | 370/390 |
| 6,996,104 | B2 * | 2/2006 | Trossen et al. .............. | 370/390 |
| 2002/0003798 | A1 * | 1/2002 | Sato et al. ................... | 370/390 |
| 2002/0085506 | A1 | 7/2002 | Hundscheidt et al. | |
| 2003/0058871 | A1 * | 3/2003 | Sastry et al. ................ | 370/401 |
| 2003/0067931 | A1 * | 4/2003 | Mansour et al. ............. | 370/412 |

FOREIGN PATENT DOCUMENTS

| | | |
|---|---|---|
| EP | 1 320 216 | 6/2003 |
| JP | 5-130002 | 5/1993 |
| JP | 2000-068959 | 3/2000 |
| JP | 2000-332751 | 11/2000 |
| JP | 2001-217788 | 8/2001 |
| JP | 2001-320324 | 11/2001 |
| WO | WO 01/26397 | 4/2001 |

OTHER PUBLICATIONS

Y. Onoe, et al., Computer Communications, vol. 21, No. 14, XP-004146583, pp. 1226-1243, "Media Scaling Applied to Multicast Communications", Sep. 15, 1998.

* cited by examiner

*Primary Examiner*—Hassan Kizou
*Assistant Examiner*—Joshua Smith
(74) *Attorney, Agent, or Firm*—Oblon, Spivak, McClelland, Maier & Neustadt, P.C.

(57) ABSTRACT

The object of the present invention is to provide a communication system which makes it possible to avoid a control load from being generated while effectively utilizing the reception capabilities of mobile stations. The communication system includes a category manager 11 configured to categorize reception capability values showing reception capabilities necessary for receiving multicast data in the mobile stations, a reception capability collector 33 configured to collect the reception capability values of the mobile stations, a decider 34 configured to decide a hierarchical structure of the multicast data from a plurality of categories corresponding to the collected reception capability values of the mobile stations and a transmitter 31 configured to transmit the multicast data using the decided hierarchical structure.

10 Claims, 8 Drawing Sheets

FIG.2

| | RECEPTION BUFFER SIZE | INTERLEAVING LENGTH | MODULATION METHOD |
|---|---|---|---|
| CATEGORY 1 | LESS THAN 1MB | 10ms | QPSK |
| CATEGORY 2 | 1MB OR MORE AND LESS THAN 5MB | 10ms, 20ms, 40ms | QPSK |
| CATEGORY 3 | 5MB OR MORE | 10ms, 20ms, 40ms, 80ms | QPSK, 16QAM |

FIG.7

| CATEGORY 1 | A, D |
|---|---|
| CATEGORY 2 | B, C, E |
| CATEGORY 3 | F |

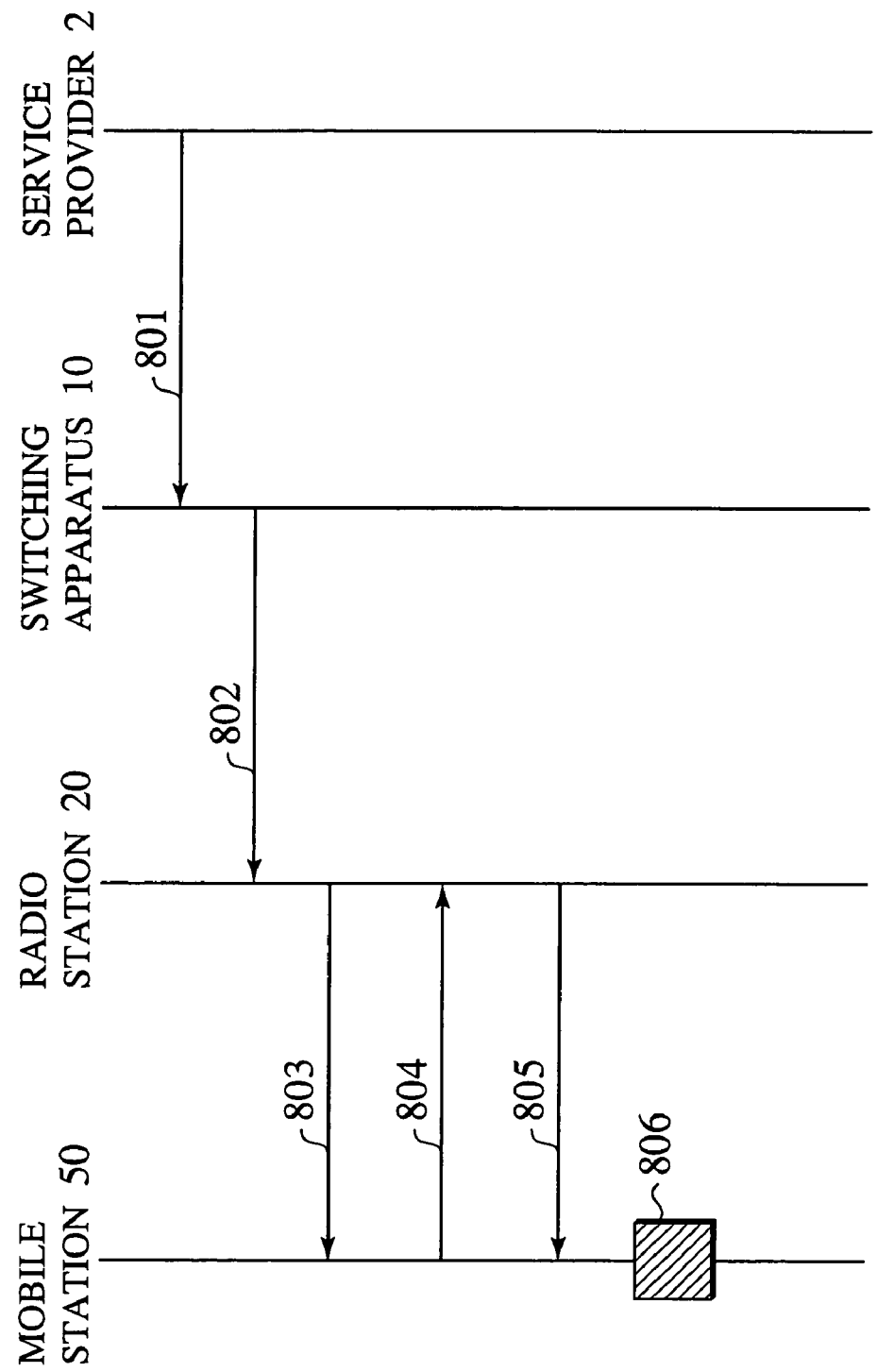

COMMUNICATION SYSTEM, COMMUNICATION METHOD AND MOBILE STATION

CROSS REFERENCE TO RELATED APPLICATION

This application is based upon and claims the benefit of priority from the prior Japanese Patent Application No. P2002-355799, filed on Dec. 6, 2002; the entire contents of which are incorporated herein by reference.

BACKGROUND OF THE INVENTION

1. Field of the Invention

The present invention relates to a communication system for transmitting multicast data to a plurality of mobile stations joining in a multicast group, a communication method and a mobile station suitably used for the same.

2. Description of the Related Art

Conventionally, a communication system performing broadcast communication whereby a base station transmits common information to all mobile stations in a radio area covered by the base station has been known.

A communication system performing multicast communication whereby a base station transmits common information to mobile stations joining in (belonging to) a predetermined multicast group has been known.

A communication system for transmitting multicast data using a hierarchical structure has been known.

A communication system for collecting reception capability values of the mobile stations joining in the same multicast group, and deciding the hierarchical structure of the multicast data by focusing on mobile stations having a specific reception capability (ability).

However, in the conventional communication system, when mobile stations having various reception capabilities are joining in the same multicast group, and when the hierarchical structure of the multicast data is decided by focusing on the mobile stations having a specific reception capability, the hierarchical structure of the multicast data must be decided by focusing on the mobile station having the lowest level of reception capability, so that all the mobile stations joining in the multicast group can receive the multicast data. Therefore, there has been a problem in that the reception capabilities of the mobile stations are not utilized effectively.

In addition, in the conventional communication system, there has been a problem in that even a mobile station not possessing a minimum required level of reception capability transmits a transmission request for multicast data, generating an unnecessary control load.

BRIEF SUMMARY OF THE INVENTION

In view of the foregoing, it is an object of the present invention to provide a communication system, a communication method and a mobile station, which make it possible to avoid a control load from being generated while effectively utilizing the reception capabilities of mobile stations.

A first aspect of the present invention is summarized as a communication system for transmitting multicast data to a plurality of mobile stations joining in a multicast group. The communication system comprises a category manager configured to categorize reception capability values showing reception capabilities necessary for receiving multicast data in the mobile stations; a reception capability collector configured to collect the reception capability values of the mobile stations; a decider configured to decide a hierarchical structure of the multicast data from a plurality of categories corresponding to the collected reception capability values of the mobile stations; and a transmitter configured to transmit the multicast data using the decided hierarchical structure.

A second aspect of the present invention is summarized as a communication system for transmitting multicast data to a plurality of mobile stations joining in a multicast group. The communication system comprises a category manager configured to categorize reception capability values showing reception capabilities necessary for receiving multicast data in the mobile stations in association with a type of the multicast data; a decider configured to decide a hierarchical structure of the multicast data from a plurality of the categories; and a transmitter configured to transmit the multicast data using the decided hierarchical structure.

In the second aspect, the communication system may further comprise a reception capability collector configured to collect the reception capability values of the mobile stations; and a notice information transmitter configured to transmit notice information including information regarding the category, in accordance with the collected reception capability values of the mobile stations.

In the second aspect, the category manager may categorize the collected reception capability values of the mobile stations in association with the type of the multicast data.

In the second aspect, the communication system may further comprise a notice information judger configured to judge whether or not the notice information should be transmitted in accordance with the collected reception capability values of the mobile stations and presence information for each of the mobile stations, and to instruct the notice information transmitter to transmit the notice information in accordance with the judgment.

In the first and second aspects, the transmitter may transmit the multicast data to the mobile stations in accordance with a transmission request from the mobile stations.

In the first and second aspects, the reception capability values of the mobile stations may be defined by a processing capability, a decoding method, a interleaving length, a number of despreaders and a number of decoders.

In the first and second aspects, the hierarchical structure may be defined by at least one of a coding rate, a number of repeating bits, a number of thinned bits, an interleaving length, a number of multiplexed codes, a number of information blocks, a modulation method, a coding method and transmission power.

A third aspect of the present invention is summarized as a communication method for transmitting multicast data to a plurality of mobile stations joining in a multicast group. The communication method comprising the steps of: (A) categorizing reception capability values showing reception capabilities necessary for receiving multicast data in the mobile stations; (B) collecting the reception capability values of the mobile stations; (C) deciding a hierarchical structure of the multicast data from a plurality of categories corresponding to the collected reception capability values of the mobile stations; and (D) transmitting the multicast data using the decided hierarchical structure.

A fourth aspect of the present invention is summarized as a mobile station for receiving multicast data. The mobile station comprises a category memory configured to store a category to which a reception capability value of the mobile station belongs; a receiver configured to receive the multicast data transmitted using a hierarchical structure; and a selector configured to select multicast data corresponding to the category stored in the category memory from among the received multicast data.

In the fourth aspect, the category memory may be updated in accordance with notice information transmitted from a radio station.

In the fourth aspect, the mobile station may further comprise a transmission requester configured to transmit a transmission request for multicast data to a radio station.

BRIEF DESCRIPTION OF THE SEVERAL
VIEWS OF THE DRAWINGS

FIG. 2 is a view to describe categories used in the communication system according to the embodiment of the present invention.

FIG. 7 is a view to describe notice information in the communication system according to the modified example of the present invention.

FIG. 8 is a flowchart showing an operation of the communication system according to the modified example of the present invention.

DETAILED DESCRIPTION OF THE INVENTION

Configuration of a Communication System
According to an Embodiment of the Present
Invention Description will be made of a configuration of a communication system according to an embodiment of the present invention with reference to FIGS. 1 to 5.

Figure 1:
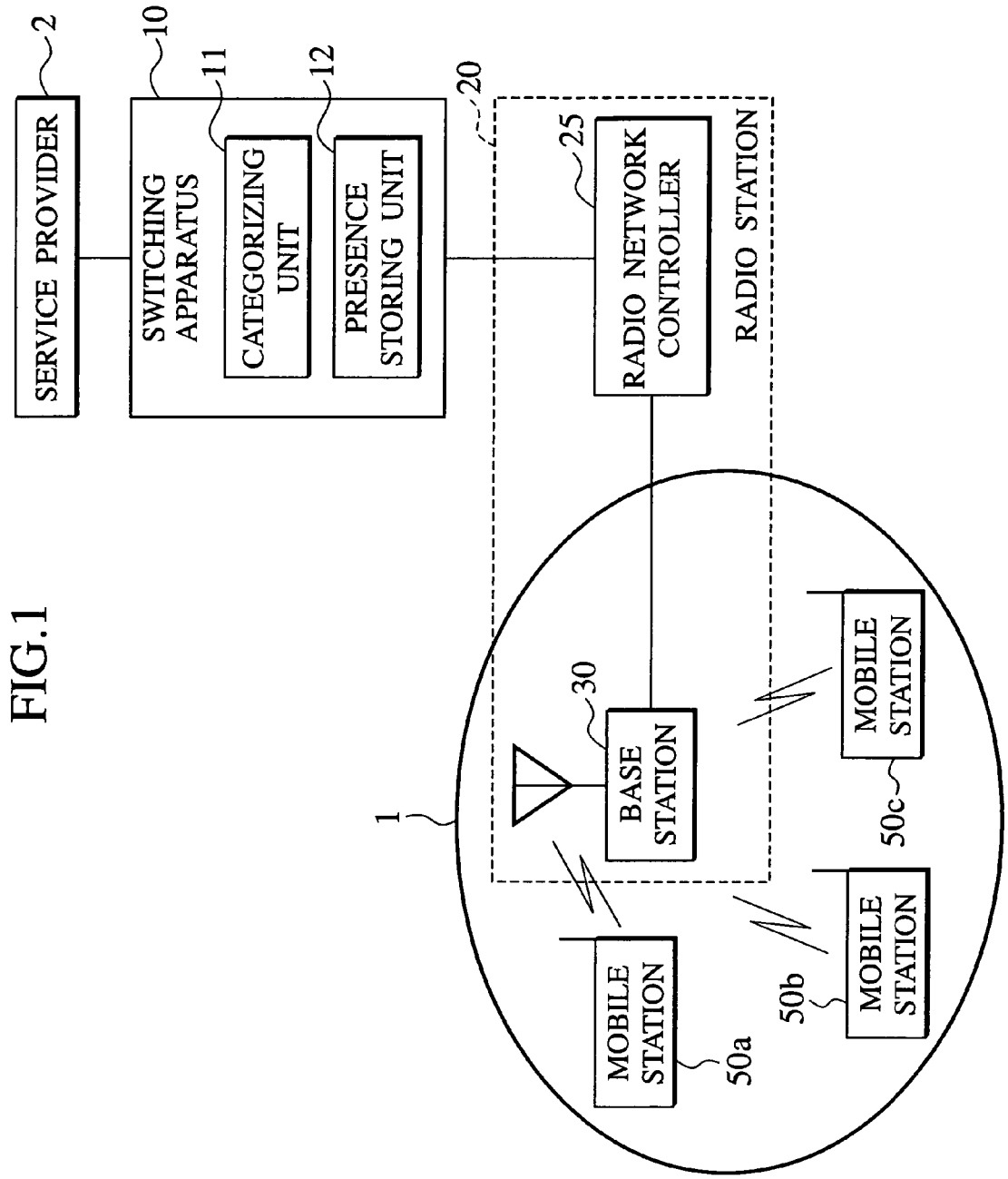
FIG. 1 is a view showing an entire configuration of a communication system according to an embodiment of the present invention.

As shown in FIG. 1, the communication system according to this embodiment includes a switching apparatus 10 and a radio station 20. The radio station 20 is configured with a radio network controller (RNC) 25 and a base station 30.

The base station 30 is configured to manage a plurality of mobile stations 50a to 50c which are present in a cell 1. In addition, the switching apparatus 10 is connected with a service provider 2.

Note that, although the switching apparatus 10 and the radio station 20 are separately provided as two independent apparatuses in this embodiment, one apparatus equipped with these functions may be provided instead.

The service provider 2 is configured to provide multicast data.

As shown in FIG. 1, the switching apparatus 10 is configured with a categorizing unit 11 and a presence storing unit 12. The switching apparatus 10 is configured to transfer the multicast data transmitted from the service provider 2 to the radio station 20.

The categorizing unit 11 is configured to categorize the reception capability values showing reception capabilities necessary for receiving multicast data in the mobile stations.

For example, as shown in FIG. 2, the categorizing unit 11 is configured to store a "reception buffer size", an "interleaving length" and a "modulation method" in association with a "category name".

In the example of FIG. 2, a mobile station whose reception buffer size is less than 1 MB, whose interleaving length is 10 ms and which employs a modulation method of quadrature phase shift keying (QPSK) is capable of receiving multicast data of the category 1.

Similarly, a mobile station whose reception buffer size is 1 MB or more and less than 5 MB, whose interleaving length is 10 ms, 20 ms or 40 ms and which employs a modulation method of quadrature phase shift keying (QPSK) is capable of receiving multicast data of the category 2.

Further, a mobile station whose reception buffer size is 5 MB or more, whose interleaving length is 10 ms, 20 ms, 40 ms or 80 ms and which employs a modulation method of QPSK or 16 quadrature amplitude modulation (QAM) is capable of receiving multicast data of the category 3.

For example, a processing capability, a decoding method, a number of despreaders and a number of decoders can define the reception capability value showing reception capabilities necessary for receiving multicast data in the mobile station, other than the reception buffer size, the interleaving length and the modulation method.

The categorizing unit 11 may manage the above categories in accordance with unique parameters, or may manage the categories in accordance with semi-static parameters which are periodically changed.

Moreover, the categorizing unit 11 may flexibly change the management of the categories in accordance with the instruction from the service provider 2 or the reception capability values of the mobile stations 50 which are present in the cell 1.

The presence storing unit 12 is configured to store presence information for each of the mobile stations 50 which are present in the cell 1.

Note that the categorizing unit 11 and the presence storing unit 12 may be provided in the radio station 20.

Figure 3:
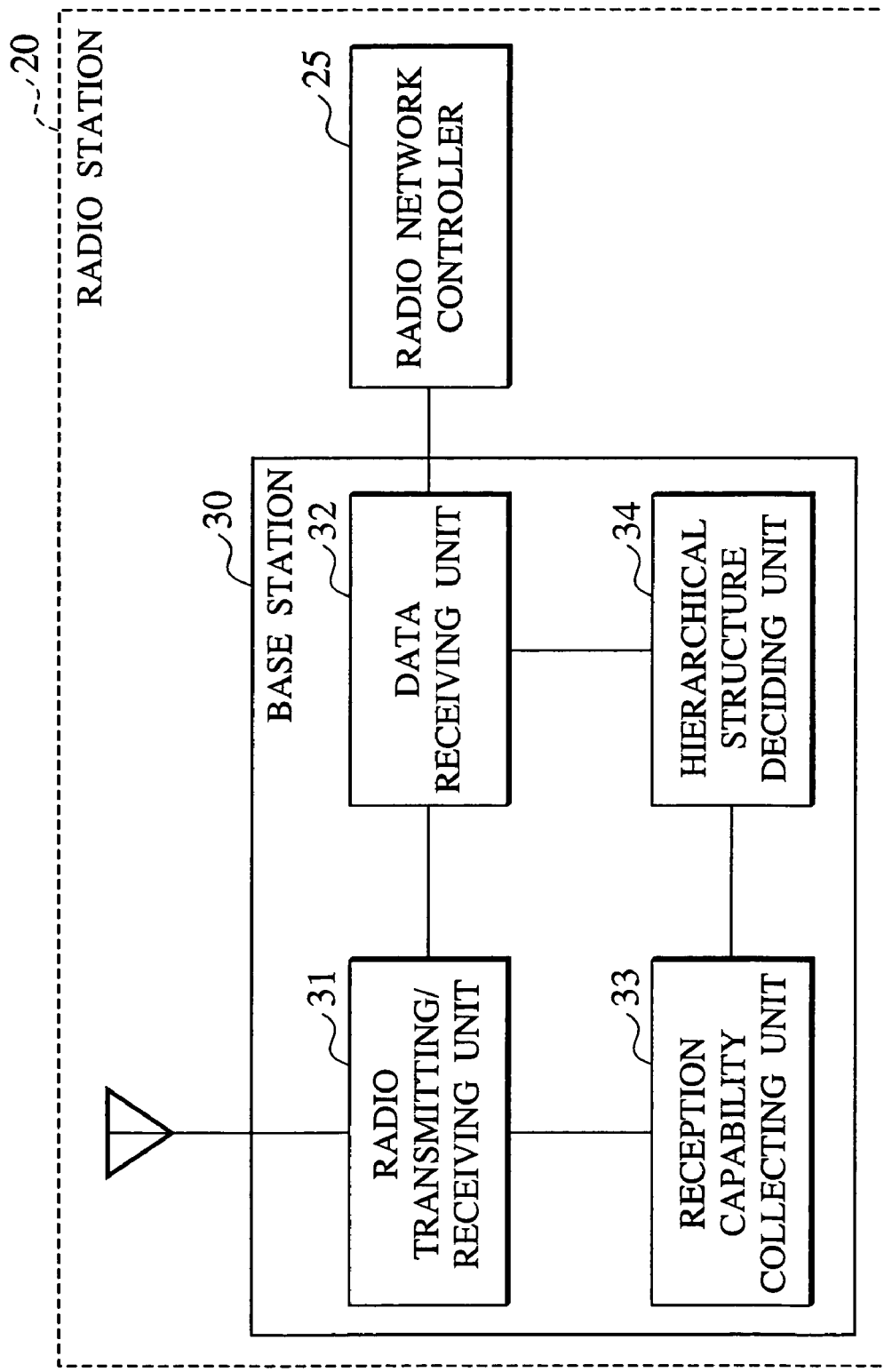
FIG. 3 is a functional block diagram of a radio station in the communication system according to the embodiment of the present invention.

As shown in FIG. 3, the radio station 20 is configured with a radio transmitting/receiving unit 31, a data receiving unit 32, a reception capability collecting unit 33, a hierarchical structure deciding unit 34.

In FIG. 3, although the respective units 31 to 34 are provided in the base station 30, part of or all of the units 31 to 34 may be provided in the radio network controller 25.

The radio transmitting/receiving unit 31 is configured to transmit the multicast data using the hierarchical structure decided by the hierarchical structure deciding unit 34.

In addition, the radio transmitting/receiving unit 31 receives radio signals transmitted from the mobile stations 50. Moreover, the radio transmitting/receiving unit 31 transmits the reception capability values of the mobile stations 50 in accordance with the instruction from the radio station 20.

The data receiving unit 32 is configured to receive the multicast data transmitted from the radio network controller 25. Additionally, the data receiving unit 32 constructs the multicast data to be transmitted using the hierarchical structure decided by the hierarchical structure deciding unit 34.

The reception capability collecting unit 33 is configured to collect the reception capability values (or categories) of the plurality of mobile stations 50 joining in a multicast group within the cell 1.

The hierarchical structure deciding unit 34 is configured to decide the hierarchical structures of the multicast data from a plurality of categories corresponding to the reception capability values of the plurality of mobile stations which are collected by the reception capability collecting unit 33

For example, when mobile stations 50 of the "category 1" and the "category 2" are joining in a multicast group, the hierarchical structure deciding unit 34 decides that hierarchical structures of the multicast data should be defined as a transmission method corresponding to the reception capability values of the "category 1" and a transmission method corresponding to the reception capability values of the "category 2".

That is, in the above case, the hierarchical structure deciding unit 34 transmits the multicast data by transmission methods corresponding to the reception capability values of the "category 1" and the reception capability values of the "category 2".

Herein, the hierarchical structure is defined by at least one of a coding rate, a number of repeating bits, a number of thinned bits, an interleaving length, a number of multiplexed codes, a number of information blocks, a modulation method, a coding method, and transmission power.

Figure 4:
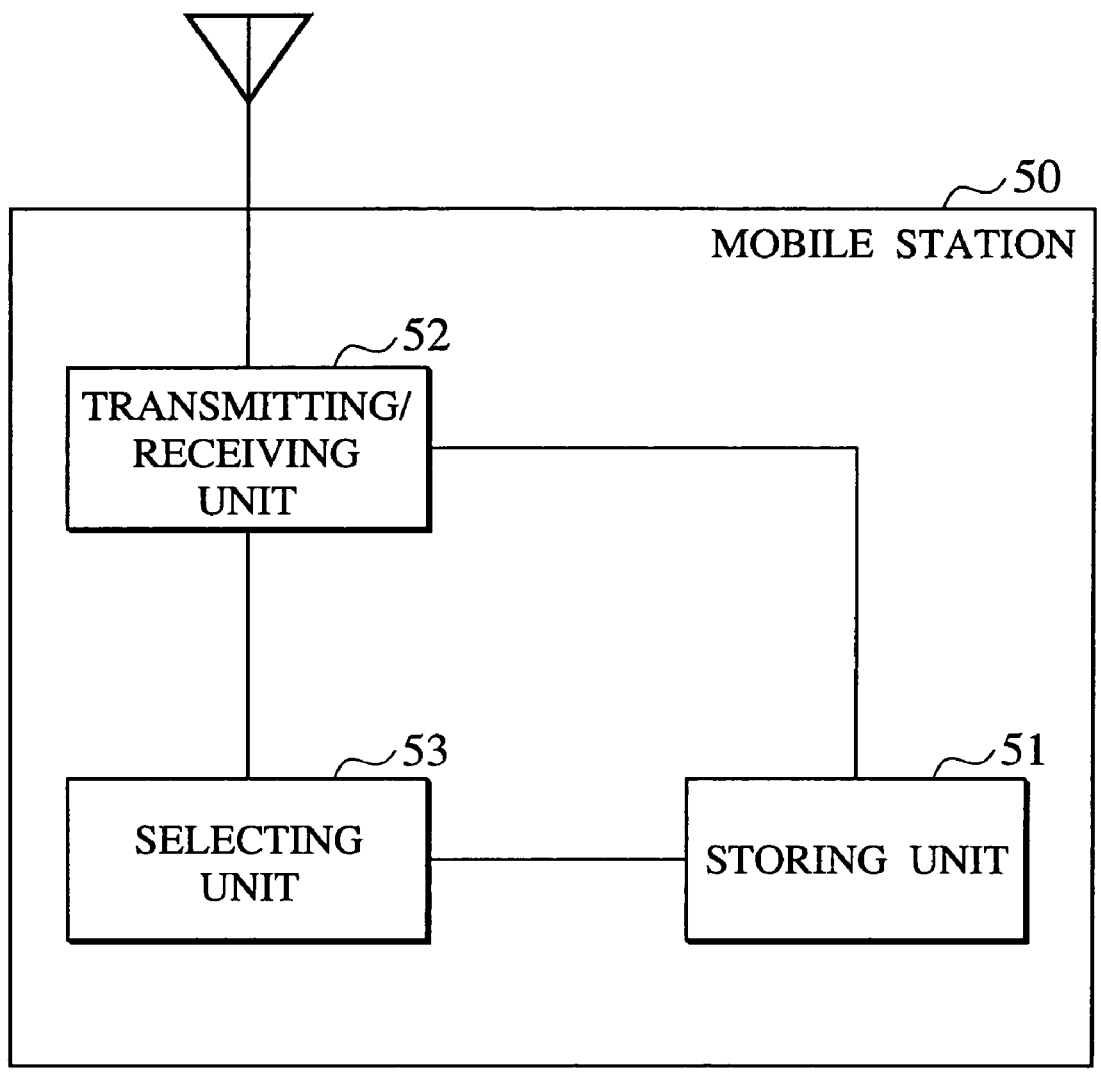
FIG. 4 is a functional block diagram of a mobile station in the communication system according to the embodiment of the present invention.

As shown in FIG. 4, the mobile station 50 is configured with a storing unit 51, a transmitting/receiving unit 52, and a selecting unit 53.

The storing unit 51 is configured to store a category to which the reception capability value of the mobile station belongs (for example, any one of the "category 1" to the "category 3").

The transmitting/receiving unit 52 is configured to transmit radio signals to the base station 30 and to receive radio signals from the base station 30.

In this embodiment, the transmitting/receiving unit 52 includes a receiving unit configured to receive the multicast data transmitted using the hierarchical structure.

Moreover, in this embodiment, the transmitting/receiving unit 52 includes a transmission requesting unit configured to transmit a transmission request for multicast data to the radio 20.

The selecting unit 53 is configured to select multicast data which the mobile station 50 is able to receive from among the multicast data received by the transmitting/receiving unit 52.

For instance, the selecting unit 53 may select multicast data corresponding to the category stored in the storing unit 51 from among the multicast data received by the transmitting/receiving unit 52.

Figure 5:
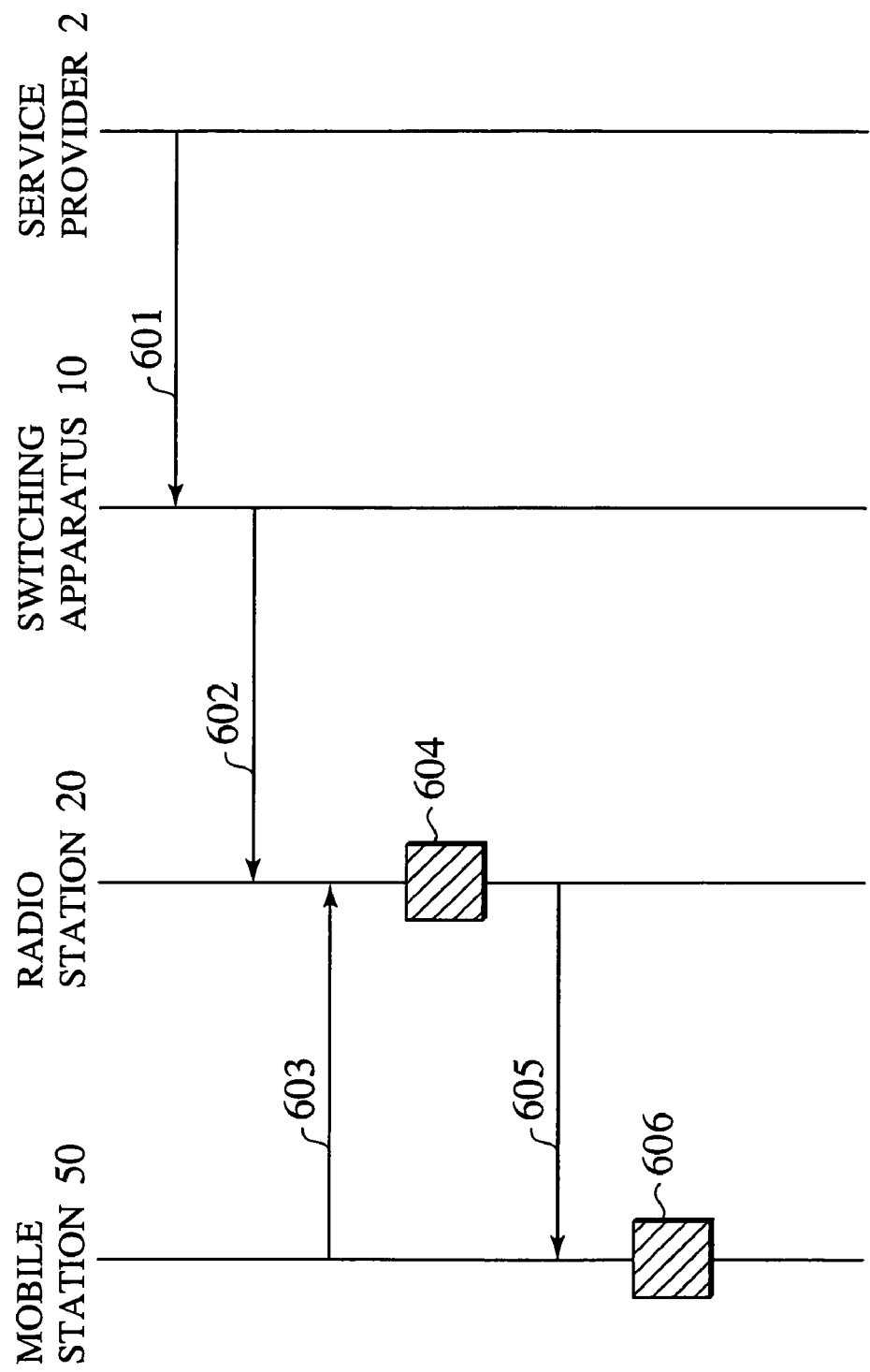
FIG. 5 is a sequence diagram showing an operation of the communication system according to the embodiment of the present invention.

Operation of the Communication System According to the Embodiment of the Present Invention Description will be made of an operation of the communication system according to the present embodiment with reference to FIG. 5. FIG. 5 is a sequence diagram showing the operation of the communication system according to this embodiment.

As illustrated in FIG. 5, in step 601, the service provider 2 transmits multicast data to the switching apparatus 10. In step 602, the switching apparatus 10 transmits the received multicast data to the radio station 20.

In step 603, the reception capability collecting unit 33 of the radio station 20 (base station 30) collects the reception capability values of the mobile stations 50 joining in a multicast group within the cell 1.

Herein, the reception capability collecting unit 33 of the radio station 20 periodically receives presence information for each of the mobile stations 50 joining in the multicast group, from the presence storing unit 12 of the switching apparatus 10.

In step 604, the hierarchical structure deciding unit 34 decides the hierarchical structures of the multicast data in accordance with a combination of categories corresponding to the reception capability values of the mobile stations 50 collected by the reception capability collecting unit 33

Herein, the hierarchical structure deciding unit 34 periodically receives information regarding the categories from the categorizing unit 11 of the switching apparatus 10.

Thereafter, the data receiving unit 32 constructs the multicast data to be transmitted, in accordance with the decided hierarchical structures.

In step 605, the radio transmitting/receiving unit 31 transmits the above-described multicast data constructed in accordance with the hierarchical structures, to the mobile stations 50 joining in the multicast group within the cell 1.

In step 606, the transmitting/receiving units 52 of the mobile stations 50 receive the hierarchical multicast data. After that, the selecting units 53 of the mobile stations 50 selectively receive multicast data that the mobile station 50 can receive.

Operations and Effects of the Communication System According to the Embodiment

According to the communication system of the present embodiment, the radio transmitting/receiving unit 31 transmits the multicast data using the hierarchical structures. The hierarchical structures are decided in accordance with a combination of categories corresponding to the collected reception capability values of the plurality of mobile stations 50 (a receive buffer size, an interleaving length, a modulation method, etc.). Accordingly, the communication system of the present embodiment can perform multicast communication whereby the reception capabilities of the mobile stations are effectively utilized.

Moreover, according to the communication system of the present embodiment, the categorizing unit 11 obtains information regarding the reception capability values of the mobile stations 50 which are present in the cell. Accordingly, the communication system of the present embodiment can associate the types of multicast data with the reception capability values of the mobile stations in accordance with the reception capability values of the mobile stations which are present in an area where the multicast data can be provided.

MODIFIED EXAMPLE

The present invention is not limited to the foregoing embodiment. The present invention can also be applied to such a configuration as in the following modified example. Hereinafter, a communication system according to the modified example will be described with reference to FIGS. 6 to 8.

Figure 6:
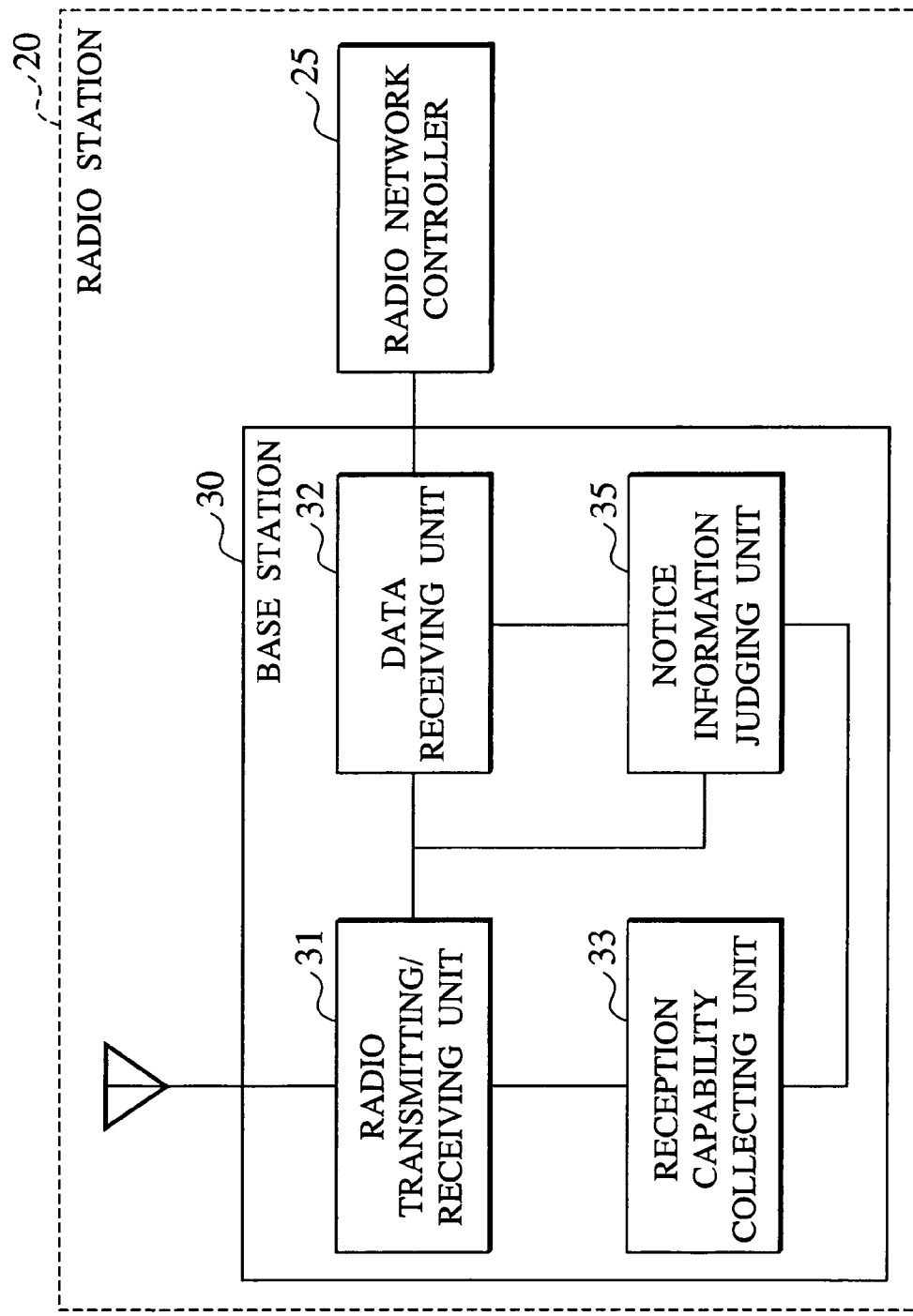
FIG. 6 is a functional block diagram of a radio station in the communication system according to a modified example of the present invention.

As shown in FIG. 6, The radio station 20 according to this modified example is configured with the radio transmitting/receiving unit 31, the data receiving unit 32, the reception capability collecting unit 33, and a notice information judging unit 35.

The radio transmitting/receiving unit 31 is configured to transmit radio signals to the mobile stations 50, and to receive radio signals from the mobile stations 50.

Moreover, the radio transmitting/receiving unit 31 includes a transmitting unit configured to transmit multicast data constructed by the data receiving unit 32 to the mobile stations 50 joining in a multicast group.

In addition, the radio transmitting/receiving unit 31 includes a notice information transmitting unit configured to transmit notice information containing information regarding the categories.

More specifically, the radio transmitting/receiving unit 31 transmits the notice information containing information regarding the categories in association with the respective multicast data and a list showing multicast data existing within the cell 1, to the mobile stations 50.

Further, the radio transmitting/receiving unit 31 according to this modified example can obtain a transmission request for multicast data from the mobile stations 50, and can transmit the multicast data to the mobile stations 50 in response to the obtained transmission request.

The data receiving unit 32 is configured to receive the multicast data and the information regarding the categories which are transmitted from the switching apparatus 10 through the radio network controller 25.

Meanwhile, the data receiving unit 32 serves as the hierarchical structure deciding unit configured to decide the hierarchical structures of the multicast data based on the combination of the categories managed by the categorizing unit 11.

Specifically, the data receiving unit 32 makes the received multicast data into hierarchical structures based on the information regarding the categories transmitted from the categorizing unit 11, so that the multicast data can be transmitted by the transmission methods corresponding to all of the categories.

The reception capability collecting unit 33 is configured to collect the reception capability values (categories) of the plurality of mobile stations joining in the multicast group.

The notice information judging unit 35 is configured to judge whether it is necessary to transmit the notice information. The judgment is conducted based on the reception capability values (categories) of the mobile stations collected by the reception capability collecting unit 33 or the presence information from which it can be recognized whether the mobile stations are present within the area where the multicast data can be provided.

The notice information judging unit 35 then instructs the radio transmitting/receiving unit 31 to transmit the notice information.

For example, the notice information judging unit 35 may be configured so that the notice information is transmitted even when only one mobile station 50 capable of receiving the multicast data is present within the cell 1.

Figure 7:
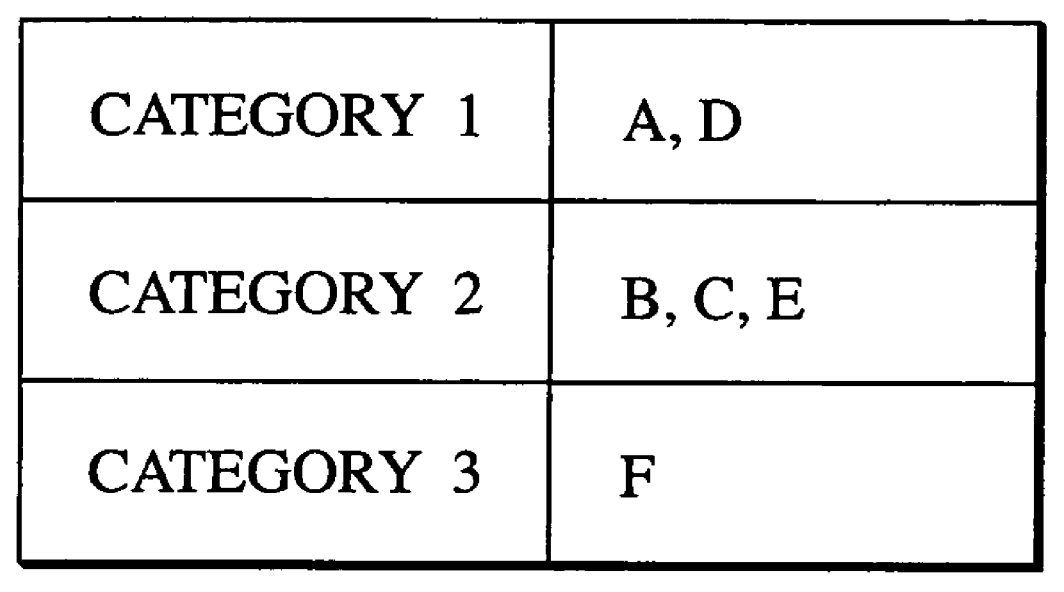

Moreover, for instance, the notice information judging unit 35 can manage the notice information containing the list showing the multicast data existing in the cell 1 and the categories in association with the respective multicast data, based on the tables illustrated in FIGS. 2 and 7.

In the example of FIG. 7, a list regarding six types of multicast data A to F existing within the cell 1 is managed. In this table, it is defined that a reception capability of "category 1" is required to receive multicast data A or D, a reception capability of "category 2" is required to receive multicast data B, C, or E, and a reception capability of "category 3" is required to receive multicast data F.

An operation of the communication system according to this modified example will be described with reference to FIG. 8. FIG. 8 is a sequence diagram showing the operation of the communication system of this modified example.

As shown in FIG. 8, is step 801, the service provider 2 transmits multicast data to the switching apparatus 10.

In step 802, the switching apparatus 10 transmits the received multicast data to the radio station 20.

In step 803, when the radio transmitting/receiving unit 31 of the radio station 20 receives from the notice information judging unit 35 an instruction to transmit the notice information, the radio transmitting/receiving unit 31 transmits the notice information containing information regarding categories to the mobile stations 50.

In step 804, the transmitting/receiving units 52 of the mobile stations 50 transmit transmission requests of the multicast data to the radio station 20.

In step 805, the radio transmitting/receiving unit 31 of the radio station 20 transmits multicast data constructed by the data receiving unit 32 based on the transmission requests transmitted from the mobile stations 50, to the mobile stations 50 that belong to the multicast group in the cell 1, using the hierarchical structures.

Here, the data receiving unit 32 constructs the multicast data so that the multicast data is transmitted using the hierarchical structures of all categories managed by the categorizing unit 11, that is, in transmission methods corresponding to all of the categories.

In step 806, the selecting unit 53 of each of the mobile stations 50 selects multicast data corresponding to the category stored in the storing unit 51, from among the received multicast data.

Here, the storing units 51 of the mobile stations 50 are updated according to the notice information received from the radio station 20.

According to the communication system of this modified example, the radio transmitting/receiving unit 31 transmits the multicast data using the hierarchical structures decided based on the categories managed by the categorizing unit 11. Therefore, multicast communication which effectively utilizes the reception capabilities of the mobile stations can be performed.

Additionally, according to the communication system of this modified example, the radio transmitting/receiving unit 31 transmits the multicast data to the mobile stations 50 when the radio transmitting/receiving unit 31 obtains transmission requests from the mobile stations 50. Moreover, the radio transmitting/receiving unit 31 transmits notice information in accordance with the presence statuses of the mobile stations 50. Accordingly, unnecessary traffic can be suppressed, and a processing load in the radio station 20 and the like can be reduced.

Note that, instead of the mode of transmitting the multicast data from the radio transmitting/receiving unit 31 in response to the transmission requests from the mobile stations 50, there can be a mode of periodically transmitting the multicast data regularly from the radio transmitting/receiving unit 31.

In this case, it is not necessary to obtain the transmission requests from the mobile stations 50. Therefore, the configurations of the radio station 20 and the mobile stations 50 can be made simpler, and the occurrence of unnecessary traffic from the mobile stations 50 to the radio station 20 can be prevented.

Furthermore, according to the communication system of this modified example, the radio transmitting/receiving unit 31 transmits notice information containing category information. Accordingly, such inconveniences as mobile stations 50 which do not possess the minimum level of reception capabilities required for the reception of the multicast data, transmitting the transmission requests for multicast data can be avoided.

As described above, according to the present invention, a communication system, a communication method and a mobile station, which are capable of preventing a control load while effectively utilizing the reception capabilities of the mobile stations, can be provided.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A communication system for transmitting multicast data to a plurality of mobile stations joining in a multicast group, the system comprising:
   a category manager configured to store a reception capability value showing a reception capability necessary for receiving multicast data in each of the mobile stations and a category corresponding to the reception capability;
   a reception capability collector configured to collect reception capability values of each of the mobile stations regardless of whether each of the mobile stations receives the multicast data, prior to transmission of the multicast data, wherein the reception capability value of each of the mobile stations is defined by at least one of a demodulation method, a reception buffer size, a processing capability, a decoding method, a interleaving length, a number of despreaders and a number of decoders;
   a transmitter configured to transmit the multicast data using a transmission method corresponding to a first category and a transmission method corresponding to a second category, when both a reception capability value corresponding to the first category and a reception capability value corresponding to the second category are collected by the reception capability collector.

2. The communication system according to claim 1, wherein the transmitter further comprises:
   a notice information transmitter configured to transmit, to the mobile stations, notice information including information regarding the category corresponding to the collected reception capability value of each of the mobile stations.

3. The communication system according to claim 2, wherein the system further comprises a notice information judger configured to judge whether or not the notice information should be transmitted to the mobile stations in accordance with the collected reception capability value of each of the mobile stations and presence information for each of the mobile stations, and to instruct the notice information transmitter to transmit the notice information in accordance with the judgment.

4. The communication system according to claim 1, wherein the transmitter transmits the multicast data to the mobile stations in accordance with a transmission request from the mobile stations.

5. The communication system according to claim 1, wherein the transmission methods corresponding to the first and second category are respectively defined by at least one of a coding rate, a number of repeating bits, a number of thinned bits, an interleaving length, a number of multiplexed codes, a number of information blocks, a modulation method, a coding method and transmission power.

6. A communication method for transmitting multicast data to a plurality of mobile stations joining in a multicast group, the method comprising the steps of:
   storing a reception capability value showing a reception capability necessary for receiving multicast data in each of the mobile stations and a category corresponding to the reception capability value;
   collecting reception capability values of each of the mobile stations regardless of whether each of the mobile stations receives the multicast data, prior to transmission of the multicast data, wherein the reception capability value of each of the mobile stations is defined by at least one of a demodulation method, a reception buffer size, a processing capability, a decoding method, a interleaving length, a number of despreaders and a number of decoders;
   transmitting the multicast data using both a transmission method corresponding to a first category and a transmission method corresponding to a second category, when both a reception capability value corresponding to the first category and a reception capability value corresponding to the second category are collected.

7. A mobile station for receiving multicast data, the station comprising:
   a category memory configured to store a category to which a reception capability value of the mobile station belongs;
   a reception capability transmitter configured to transmit a reception capability value of the mobile station regardless of whether the mobile station receives the multicast data, prior to transmission of the multicast data;
   a receiver configured to receive the multicast data transmitted using a plurality of transmission methods corresponding to reception capability values collected from mobile stations joining in a multicast group; and
   a selector configured to select multicast data corresponding to the category stored in the category memory from among the received multicast data,
   wherein the category to which a reception capability value of the mobile station belongs is defined by at least one of a demodulation method, a reception buffer size, a processing capability, a decoding method, a interleaving length, a number of despreaders and a number of decoders.

8. The mobile station according to claim 7, wherein the category memory is updated in accordance with notice information transmitted from a radio station.

9. The mobile station according to claim 7, the station further comprising a transmission requester configured to transmit a transmission request for multicast data to a radio station.

10. The communication system according to claim 1, wherein the category is associated with a type of multicast data.

* * * * *